US010608729B1

(12) United States Patent
Youtz et al.

(10) Patent No.: US 10,608,729 B1
(45) Date of Patent: Mar. 31, 2020

(54) FIFTH GENERATION NEW RADIO REPEATER STATE MACHINE

(71) Applicant: Verizon Patent and Licensing Inc., Arlington, VA (US)

(72) Inventors: Andrew E. Youtz, Princeton, NJ (US); Lily Zhu, Parsippany, NJ (US); Xin Wang, Morris Plains, NJ (US); Shen-De Lin, Morris Plains, NJ (US); Paul R. McDonough, Marlboro, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/281,625

(22) Filed: Feb. 21, 2019

(51) Int. Cl.
*H04B 7/14* (2006.01)
*H04W 16/28* (2009.01)
*H04B 7/0456* (2017.01)
*H04W 76/27* (2018.01)
*H04W 24/02* (2009.01)
*H04W 76/11* (2018.01)
*H04W 88/04* (2009.01)

(52) U.S. Cl.
CPC ............ *H04B 7/14* (2013.01); *H04B 7/0486* (2013.01); *H04W 16/28* (2013.01); *H04W 24/02* (2013.01); *H04W 76/11* (2018.02); *H04W 76/27* (2018.02); *H04W 88/04* (2013.01)

(58) Field of Classification Search
CPC ........................................................ H04B 7/14
See application file for complete search history.

(56) References Cited

U.S. PATENT DOCUMENTS

| 2018/0160377 | A1* | 6/2018 | Abramsky | ........... | H04B 7/0617 |
| 2018/0367619 | A1* | 12/2018 | Jung | ................... | H04L 61/1511 |
| 2019/0052378 | A1* | 2/2019 | Yiu | ....................... | H04B 7/0617 |
| 2019/0200280 | A1* | 6/2019 | Ramle | ...................... | H04W 8/02 |

* cited by examiner

*Primary Examiner* — Hsinchun Liao

(57) ABSTRACT

A computer device may include a memory storing instructions and processor configured to execute the instructions to establish a communication channel with a fixed wireless access (FWA) user equipment (UE) device associated with a provider; scan for Fifth Generation (5G) New Radio (NR) antenna beams from a base station associated with the provider; and identify a plurality of 5G NR antenna beams. The processor may be further configured to rank the plurality of 5G NR antenna beams based on a key performance indicator (KPI); select a highest ranked antenna beam, from the plurality of 5G NR antenna beams, via which the FWA UE device is able to connect to the base station associated with the provider while satisfying a threshold requirement associated with the KPI; and use the selected antenna beam to exchange wireless signals between the base station and the FWA UE device.

20 Claims, 8 Drawing Sheets

| BEAM ID 510 | ANTENNA SETTINGS 520 | CONNECTION 530 | TIME PERIOD 542 | REPEATER KPI 544 | RANK 546 | FWA DEVICE KPI 548 |
|---|---|---|---|---|---|---|

FIG. 5

FIFTH GENERATION NEW RADIO REPEATER STATE MACHINE

BACKGROUND INFORMATION

To satisfy the needs and demands of users of mobile communication devices, providers of wireless communication services continue to improve and expand available services as well as networks used to deliver such services. One aspect of such improvements includes the development of wireless access networks as well as options to utilize such wireless access networks. A wireless access network may manage a large number of devices using different types of services and experiencing various types of different conditions, such as different radio frequency (RF) environments. Managing all the various types of RF environments that may arise poses various challenges.

BRIEF DESCRIPTION OF THE DRAWINGS

FIG. 5 is a diagram illustrating exemplary components of the beam database of FIG. 4 according to an implementation described herein;

DETAILED DESCRIPTION OF PREFERRED EMBODIMENTS

Figure 1:
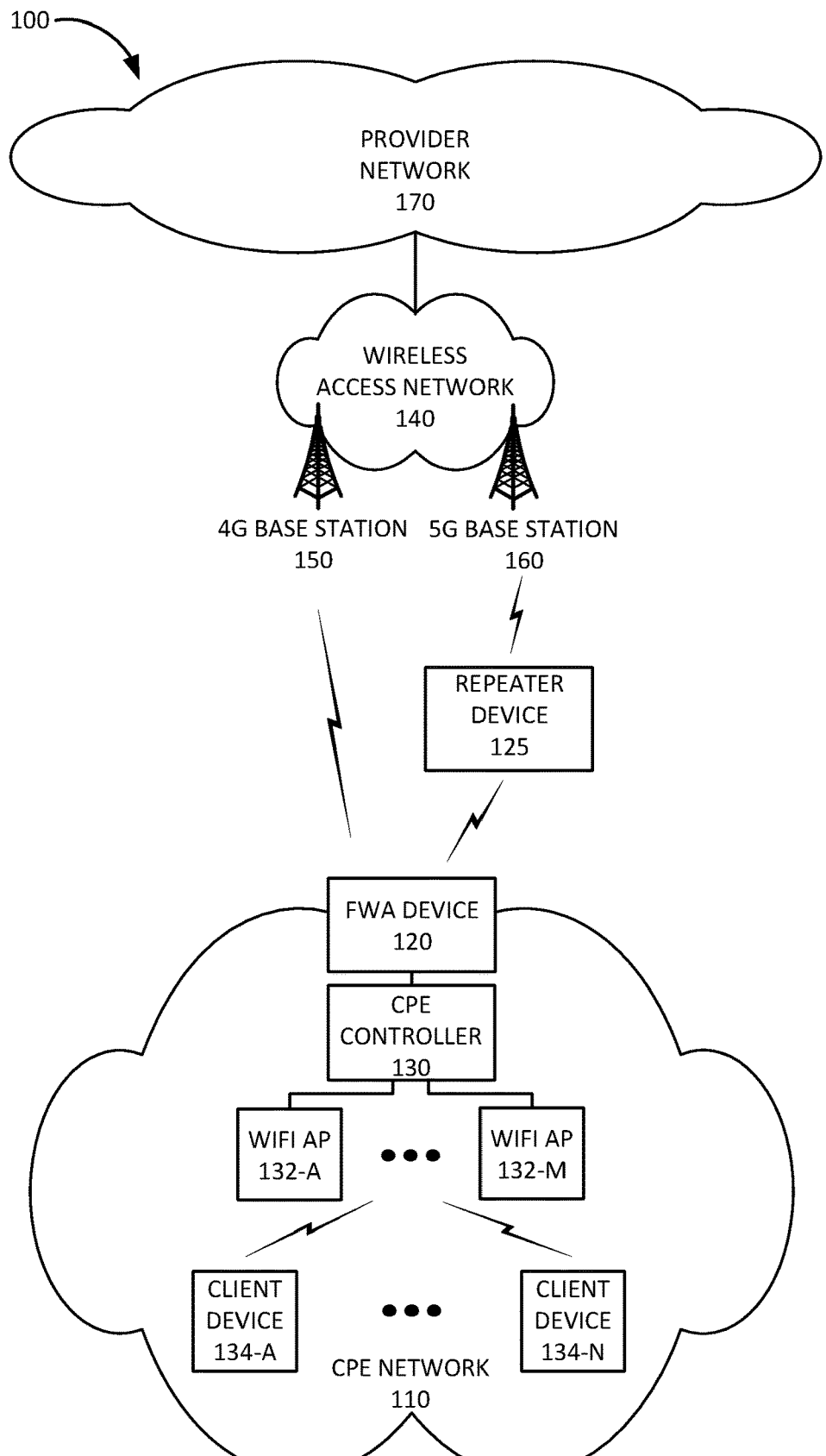
FIG. 1 is a diagram illustrating an environment according to an implementation described herein.

The following detailed description refers to the accompanying drawings. The same reference numbers in different drawings identify the same or similar elements.

As communication networks and services increase in size, complexity, and number of users, management of the communication networks has become increasingly more complex. One way in which wireless access networks are continuing to become more complicated is by incorporating various aspects of next generation networks, such as fifth generation (5G) mobile networks, utilizing high frequency bands, and/or lower frequency bands such as Sub 6 Gigahertz (GHz), and a large number of antennas. 5G New Radio (NR) millimeter (mm) wave technology may provide significant improvements in bandwidth and/or latency over other wireless network technology. Furthermore, coverage and signal quality may be improved using multiple-input and multiple-output (MIMO) adaptive antenna arrays. Additionally, user equipment (UE) devices may also include multiple antennas to improve spectral efficiency.

The 5G NR mm-wave air interface may include a high bandwidth that provides high data throughput in comparison to the data throughput of a Fourth Generation (4G) Long Term Evolution (LTE) air interface. To take advantage of the high bandwidths available via the 5G NR air interface, a provider of communication services may deploy fixed wireless access (FWA) devices to provide telecommunication services, such as Internet service that includes Voice over Internet Protocol (VoIP), video streaming, live gaming, Internet browsing, etc. Thus, instead of a wired electrical connection (e.g., a coaxial cable connection, etc.) or an optical connection (e.g., an optical network terminal (ONT) connected to an optical fiber, etc.), an FWA device may connect a customer to a network through one or more base stations via wireless over the air (OTA) signals. The FWA device may function as a UE device with respect to the one or more base stations. Thus, an FWA device may be installed in a fixed location at the customer premises associated with a customer, such as a residential house, an apartment building, an office building, etc.

However, because of the high mm-wave frequencies, the 5G NR air interface may be susceptible to intermittent signal quality degradation due to multipath wave propagation and fading, as a result of building penetration losses; scattering from terrain objects, such as buildings, foliage, mountains, vehicles, etc.; reflection from bodies of water; ionospheric reflection and/or refraction; atmospheric attenuation and scattering; and/or other types of signal interference. Such variations in signal quality may be particularly important in areas with a low density of 5G coverage, such as during the initial deployment of 5G base stations in an area. Thus, many locations in an area serviced by a 5G NR base station, such as a customer premises location where a FWA device is to be installed, may not receive 5G NR signals of sufficient strength or quality to satisfy a service requirement.

The signal strength experienced by a FWA device at a particular location may be increased through the placement of a repeater device between the FWA device and the 5G NR base station. A repeater device may extend the range of transmitted wireless signals. The repeater device may receive wireless signals from a base station, amplify the received wireless signals, and re-broadcast the amplified wireless signals toward the FWA device. Similarly, the repeater device may receive wireless signals from the FWA device, amplify the received wireless signals, and re-broadcast the amplified wireless signals toward the base station.

As mentioned above, a 5G NR air interface may be implemented with an antenna array with a large number of controllable antenna elements. The antenna array of a 5G NR base station may generate multiple antenna beams that point to multiple user devices simultaneously using spatial multiplexing and/or beam forming. An antenna beam may correspond to a radiation pattern focused in a particular direction. An optimum antenna array setting for a particular UE device may form an antenna beam directed toward the location of the particular UE device in such a way that the particular UE device receives signals at the maximum available signal power and/or quality, while minimizing interference to other UE devices serviced by a base station sector associated with an antenna array wireless transceiver. Thus, if a base station sector services k UE devices, the antenna array may form up to k simultaneous antenna beams. A particular antenna beam may be generated by logically grouping multiple antenna array elements and generating an antenna beam pattern through phase shifting applied to the antenna array elements. For each UE device, a radio communication channel is established between the 5G base station and the UE device through a beam management process in which both the base station and the UE device select the best antenna beam to maximize the received signal strength.

A repeater device may need to select the best available antenna beam for enabling communication between a 5G base station and a FWA device. As an example, the repeater device may not be able to determine via which antenna beams the FWA device is able to communicate with the 5G base station, as base stations from other providers may be broadcasting in the area. As another example, the FWA device may be associated with signal strength and/or quality requirements, measured by one or more key performance indicators (KPIs), and the repeater device may need to select an antenna beam that results in the FWA device satisfying the signal strength and/or quality requirements.

Implementations described herein relate to a 5G NR repeater state machine. A 5G repeater device may include a finite state machine that is used to select an antenna beam from a 5G NR base station via which to connect a FWA device to the 5G NR base station and to monitor the connection to determine whether the FWA device is able to connect to the 5G NR base station using the selected antenna beam and to receive signals from the 5G NR base station using the selected antenna beam while satisfying a signal strength/quality requirement.

The finite state machine may include a power up state, an acquisition state, a steady-state state, a signal failure state, and an idle state. When first powered up, the repeater device may enter the power up state and check to see if a FWA device, with which the repeater device has been paired, has entered a powered-on state. The repeater device and the FWA device may be paired through a short range wireless communication connection, such as a WiFi or Bluetooth® connection. During the pairing, the repeater device may receive an identifier associated with the FWA device via the short range wireless communication connection. If the FWA device is powered on, the repeater device may enter the acquisition state. In the acquisition state, the repeater device may scan for available antenna beams and may select the best antenna beam for the FWA device.

Thus, the repeater device may be configured to establish a communication channel with a FWA device associated with a provider, scan for 5G NR antenna beams from a base station associated with the provider, identify a set of candidate 5G NR antenna beams, and rank the set of candidate 5G NR antenna beams based on one or more KPIs. The repeater device may scan for the 5G NR antenna beams by, for example, tuning a beamforming antenna through a series of beamforming tunings.

The repeater device may then select a highest ranked antenna beam, from the set of candidate 5G NR antenna beams, via which the FWA UE device is able to connect to the base station associated with the provider while satisfying a threshold requirement associated with the KPI, and use the selected antenna beam to exchange wireless signals between the base station and the FWA UE device. The KPI threshold requirement may be based on a Reference Signal Received Power (RSRP) value, a Reference Signal Received Quality (RSRQ) value, a Received Signal Strength Indication (RSSI) value, a signal-to-interference-plus-noise ratio (SINR) value, a signal to noise ratio (SNR) value, a block error rate (BLER) value, an amplifier gain setting value, a channel state information (CSI) value, and/or another type of KPI value.

The antenna beam may be selected by cycling through the ranked set of candidate 5G NR antenna beams in descending rank until the FWA device is able to connect to the base station while satisfying the threshold requirement associated with the KPI. For example, the repeater device may select a candidate antenna beam from the set of candidate 5G NR antenna beams, enable the FWA device to establish a connection with the base station using the selected candidate antenna beam, and determine whether the FWA device is able to communicate with the base station via the selected candidate antenna beam while satisfying the threshold requirement associated with the KPI. If the FWA device is not able to lock not the candidate antenna beam (e.g., because the configuration information associated with the candidate antenna beam does not correspond to the configuration information associated with the provider), or if the KPI value received from the FWA device does not satisfy the threshold requirement, the repeater device may select the next highest ranked antenna beam as the next candidate antenna beam.

After an antenna beam is selected which satisfies the KPI threshold requirement, the repeater device may enter a steady-state state. The steady-state state may be maintained while the KPI threshold requirement is satisfied. If the repeater device detects a radio link failure report from the FWA device, or that the KPI threshold requirement is not being satisfied, the repeater device may, in response, enter a signal failure state. In the signal failure state, the repeater device may wait a particular time period to determine whether the selected antenna beam may be re-acquired and the KPI threshold requirement satisfied again. If the selected antenna beam is re-acquired within the particular time period and the KPI threshold requirement satisfied, the repeater device may re-enter the steady-state state. Otherwise, the repeater device may return to the acquisition state. Furthermore, if the repeater device detects that the FWA device has entered a Radio Resource Control (RRC) idle mode, the repeater device may enter an idle state in response. In the idle state, the repeater device may enter a power saving mode.

FIG. 1 is a diagram of an exemplary environment 100 in which the systems and/or methods, described herein, may be implemented. As shown in FIG. 1, environment 100 may include a customer premises equipment (CPE) network 110, a repeater device 125, a wireless access network 140, and a provider network 170.

CPE network 110 may include a Layer 2 and/or Layer 3 local area network (LAN) associated with a customer's premises. For example, CPE network 110 may be located at or within a residential home, in an apartment building, in a school, in a commercial office building, in a shopping mall, in a connected mass transit vehicle (e.g., bus, train, plane, boat, etc.), and/or in another type of location associated with a customer of a provider of telecommunication services. CPE network 110 may receive one or more services via a wireless connection between FWA device 120 and provider network 170, such as, for example, a television service, Internet service, and/or voice communication (e.g., telephone) service. CPE network 110 may be implemented as a gigabit network that enables gigabit speed connections. CPE network 110 may include FWA device 120, a CPE controller 130, WiFi APs 132-A to 132-M (referred to herein collectively as "WiFi APs 132" and individually as "WiFi AP 132"), and client devices 134-A to 134-M (referred to herein collectively as "client devices 134" and individually as "client device 134").

FWA device 120 may be installed in a particular location at, or near, the customer premises, such as outside a building (e.g., on a roof, attached to an outside wall, attached to a window, etc.) or inside a building (e.g., next to a window or at another location associated with good wireless signal reception). FWA device 120 may be configured to attach to, and communicate with, wireless access network 140 and may be perceived as a user equipment (UE) device by wireless access network 140. FWA device 120 may be configured to communicate via both a 4G LTE air interface and a 5G NR air interface.

CPE controller 130 may include a network device configured to function as a switch and/or router for devices in CPE network 110. CPE controller 130 may connect devices in CPE network 110 to FWA device 120. CPE controller 130 may include a layer 2 and/or layer 3 network device, such as a switch, router, firewall, and/or gateway and may support different types of interfaces, such as an Ethernet interface, a WiFi interface, a Multimedia over Coaxial Alliance (MoCa) interface, and/or other types of interfaces. CPE controller 130 may further manage WiFi APs 132 and/or client devices 134 connected to WiFi APs 132.

WiFi AP 132 may include a transceiver configured to communicate with client devices 134 using WiFi signals, such as those based on the Institute of Electrical and Electronics Engineers (IEEE) 802.11 standards for implementing a wireless LAN network. WiFi AP 132 may enable client devices 134 to communicate with each other and/or with FWA device 120 via CPE controller 130. WiFi AP 132 may be connected to CPE controller 130 via a wired connection (e.g., an Ethernet cable). Furthermore, WiFi APs 132 may include one or more Ethernet ports for connecting client devices 134 via a wired Ethernet connection. In some implementations, FWA device 120 may include, and/or perform the functions of, CPE controller 130 and/or WiFi AP 132.

Client device 134 may include any computer device that connects to a particular WiFi AP 132 using WiFi wireless signals. For example, client device 134 may include a handheld wireless communication device (e.g., a mobile phone, a smart phone, a phablet device, etc.); a wearable computer device (e.g., a head-mounted display computer device, a head-mounted camera device, a wristwatch computer device, etc.), a global positioning system (GPS) device; a laptop computer, a tablet computer, or another type of portable computer; a desktop computer; a set-top box or a digital media player (e.g., Apple TV, Google Chromecast, Amazon Fire TV, etc.); a smart television; a portable gaming system; a home appliance device; a home monitoring device; and/or any other type of computer device with wireless communication capabilities. Client device 134 may be used for voice communication, mobile broadband services (e.g., video streaming, real-time gaming, premium Internet access etc.), best effort data traffic, and/or other types of applications. As another example, client device 134 may correspond to an embedded wireless device that communicates wirelessly with other devices over a machine-to-machine (M2M) interface using machine-type communication (MTC) and/or another type of M2M communication.

Wireless access network 140 may provide access to provider network 170 for wireless devices, such as FWA device 120. Wireless access network 140 may enable FWA device 120 to connect to provider network 170 for mobile telephone service, Short Message Service (SMS) message service, Multimedia Message Service (MMS) message service, Internet access, cloud computing, and/or other types of data services.

Wireless access network 140 may establish or may be incorporated into a packet data network connection between FWA device 120 and provider network 170 via one or more Access Point Names (APNs). If wireless access network 140 includes a 5G SA architecture that implements network slicing, wireless access network 140 may establish a packet data network connection between FWA 120 and a particular network data network via a Data Network Name (DNN). Thus, wireless access network 140 may establish an Internet Protocol (IP) connection between FWA device 120 and provider network 170 or another network reachable via provider network 170. Furthermore, wireless access network 140 may enable FWA device 120 to communicate with an application server, and/or another type of device, located in provider network 170 using a communication method that does not require the establishment of an IP connection between FWA device 120 and provider network 170, such as, for example, Data over Non-Access Stratum (DoNAS).

In some implementations, wireless access network 140 may include a Long Term Evolution (LTE) access network (e.g., an evolved packet core (EPC) network). In other implementations, wireless access network 140 may include a Code Division Multiple Access (CDMA) access network. For example, the CDMA access network may include a CDMA enhanced High Rate Packet Data (eHRPD) network (which may provide access to an LTE access network).

Furthermore, wireless access network 140 may include an LTE Advanced (LTE-A) access network and/or a 5G access network or other advanced network that includes functionality such as carrier aggregation; higher-order modulation schemes, such as 256 quadrature amplitude modulation (QAM), 1024-QAM, etc.; advanced or massive multiple-input and multiple-output (MIMO) configurations (e.g., a 4×4 antenna configuration, an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Wireless access network 140 may include LTE EPC network elements, such as a Mobility Management Entity (MME), a Serving Gateway (SGW), a Packet Data Network Gateway (PGW), a Home Subscriber Server (HSS), a Policy and Charging Rules Function (PCRF), and/or other EPC network elements. In other implementations, wireless access network 140 may include a 5G Standalone (SA) architecture that includes 5G network functions such as an Access and Mobility Function (AMF), a User Plane Function (UPF), a Session Management Function (SMF), an Application Function (AF), a Unified Data Management (UDM), a Policy Control Function (PCF), a Network Repository Function (NRF), a Network Exposure Function (NEF), a Network Slice Selection Function (NSSF), and/or other 5G SA network elements. Furthermore, the 5G SA network may be configured to implement network slicing.

5G NR coverage may initially be deployed as islands relative to existing air interface coverage. Thus, areas with 5G NR coverage may also provide existing 4G LTE coverage, and UE devices enabled to communicate using 5G NR may be able to attach to both a 4G base station and a 5G base station. A UE device may be simultaneously attached to a master cell group (MCG), also known as a master eNodeB, and a secondary cell group (SCG), also known as a secondary eNodeB. If 5G NR coverage is available, the SCG may correspond to a 5G NR base station, referred to as a gNodeB.

Dual coverage using 4G and 5G networks may be referred to as Non-Standalone (NSA) architecture.

Thus, as described herein, wireless access network 140 may include a 4G base station 150 (e.g., an eNodeB) and a 5G base station 160 (e.g., a gNodeB). 4G base station 150 and 5G base station 160 may each include one or more radio frequency (RF) transceivers that include devices and/or components configured to enable wireless communication with FWA devices 120. 4G base station 150 may be configured to communicate with FWA device 120 using a 4G LTE air interface. 5G base station 160 may be configured to communicate with FWA device 120 using a 5G NR air interface. For example, 5G base station 160 may include one or more antenna arrays configured to send and receive wireless signals in the mm-wave frequency range.

FWA device 120 may communicate with 5G base station 160 via repeater device 125. Repeater device 125 may receive 5G NR signals from 5G base station 160, amplify the received 5G NR signals, and transmit the amplified signals toward FWA device 120. Similarly, repeater device 125 may receive 5G NR signals from FWA device 120, amplify the received 5G NR signals, and transmit the amplified signals toward 5G base station 160. FWA device 120 may implement a finite state machine that includes an acquisition state for selecting an antenna beam from 5G base station 160 to which FWA device 120 is able to connect while satisfying one or more KPI threshold requirements.

Packet data network 170 may include, and/or be connected to and enable communication with, a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. Some or all of provider network 170 may be managed by a provider of communication services that also manages wireless access network 140, FWA device 120, and/or repeater device 125. Provider network 170 may allow the delivery of Internet Protocol (IP) services to FWA device 120, and may interface with other external networks. Provider network 170 may include one or more server devices and/or network devices, or other types of computation or communication devices. In some implementations, provider network 170 may include an IP Multimedia Sub-system (IMS) network (not shown in FIG. 1). An IMS network may include a network for delivering IP multimedia services and may provide media flows between FWA device 120 and external IP networks or external circuit-switched networks (not shown in FIG. 1).

Although FIG. 1 shows exemplary components of environment 100, in other implementations, environment 100 may include fewer components, different components, differently arranged components, or additional functional components than depicted in FIG. 1. Additionally, or alternatively, one or more components of environment 100 may perform functions described as being performed by one or more other components of environment 100.

Figure 2:
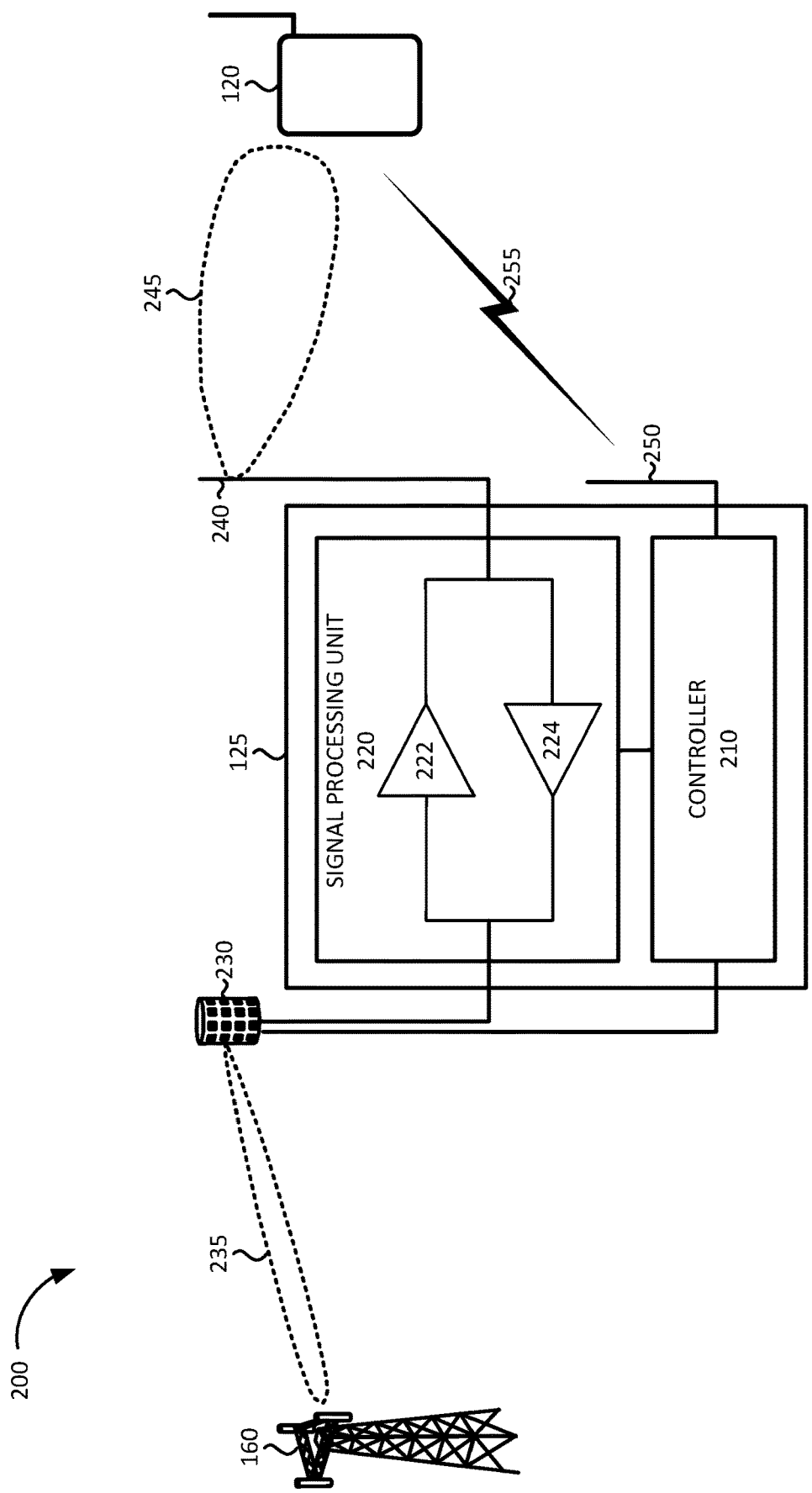
FIG. 2 is a diagram illustrating an exemplary system that includes the repeater device of FIG. 1 according to an implementation described herein.

FIG. 2 is a diagram illustrating an exemplary system 200 that includes repeater device 125. As shown in FIG. 2, system 200 may include 5G base station 160, repeater device 125, and FWA device 120. Repeater device 125 may include a controller 210, a signal processing unit 220, an antenna array 230, a 5G antenna 240, and a short-range antenna 250. Controller 210 may control the operation of repeater device 125. Exemplary components of controller 210 are described below with reference to FIG. 4. Signal processing unit 220 may include a first amplifier 222 and second amplifier 224. First amplifier 222 may amplify signals received from 5G base station 160 before transmitting the signals toward FWA device 120. Second amplifier 224 may amplify signals received from FWA device 120 before transmitting the signals toward 5G base station 160.

Antenna array 230 may include an array of controllable antenna elements configured to send and receive 5G NR wireless signals. The antenna elements may be digitally controllable to electronically tilt or steer an antenna beam in a vertical direction and/or horizontal direction. Antenna array 230 may generate a directional antenna beam 235 toward 5G base station 160. Similarly, antenna array 230 may be tuned to receive signals from a directional antenna beam generated by 5G base station 160. 5G antenna 240 may include an omnidirectional or directional 5G antenna. 5G antenna 240 may generate an antenna beam 245 toward FWA device 120. Short-range antenna 250 may enable controller 210 to communicate with FWA device 120 using a short-range wireless communication signals 255, via a connection such as as WiFi or Bluetooth. Short-range antenna 250 may be used to pair repeater device 125 with FWA device 120. In some implementations, repeater device 125 may use short-range antenna 250 to receive determined KPI values from FWA device 120 relating to a 5G connection established between FWA device 120 and 5G base station 160 via repeater device 125.

Although FIG. 2 shows exemplary components of system 200, in other implementations, system 200 may include fewer components, different components, differently arranged components, or additional functional components than depicted in FIG. 2.

Figure 3:
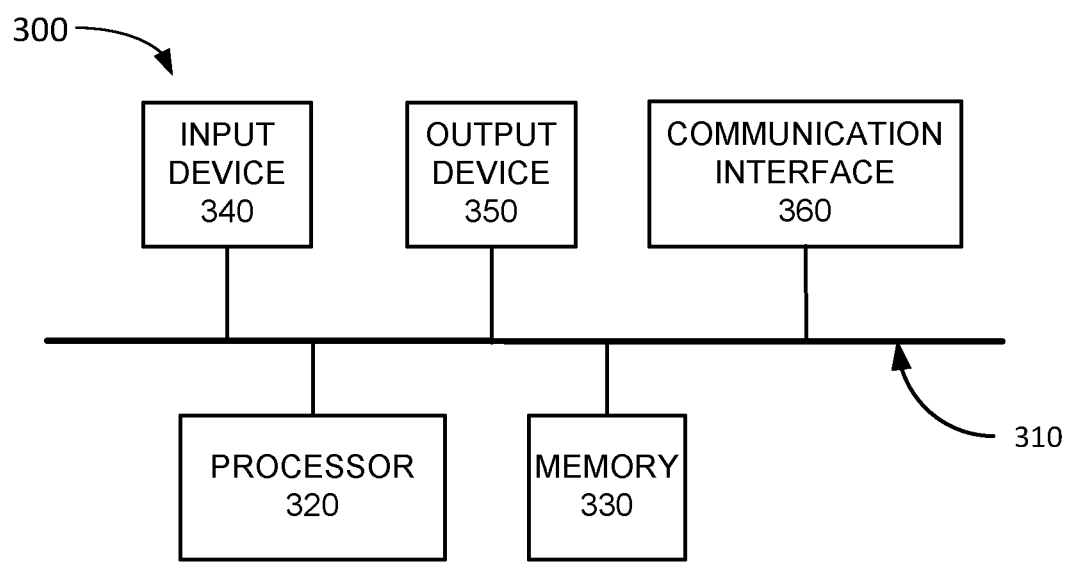
FIG. 3 is a diagram illustrating exemplary components of a device that may be included in a component of FIG. 1 according to an implementation described herein.

FIG. 3 is a diagram illustrating example components of a device 300 according to an implementation described herein. FWA device 120, repeater device 125, CPE controller 130, WiFi AP 132, client device 134, 4G base station 150, and/or 5G base station 160 may each include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, output device 350 may include a display, which may include a liquid-crystal display (LCD) for displaying content to the customer. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals. Communication interface 360 may be coupled to one or more antennas/antenna arrays for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to a 5G repeater state machine. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally, or alternatively, one or more components of device 300 may perform one or more tasks described as being performed by one or more other components of device 300.

Figure 4:
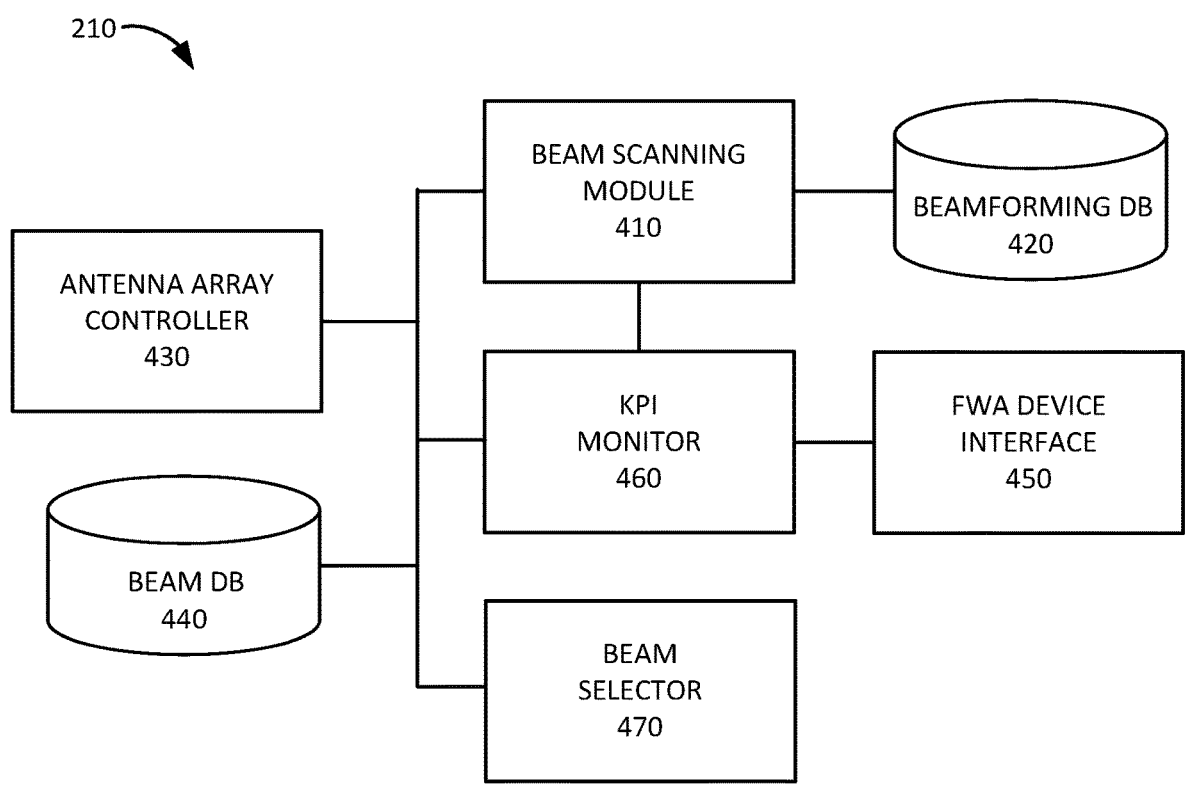
FIG. 4 is a diagram illustrating exemplary components of the controller of FIG. 2 according to an implementation described herein.

FIG. 4 is a diagram illustrating exemplary functional components of repeater device 210. The components of repeater device 210 may be implemented, for example, via processor 320 executing instructions from memory 330. Alternatively, some or all of the functional components of repeater device 210 may be implemented via hard-wired circuitry. As shown in FIG. 4, repeater device 210 may include a beam scanning module 410, a beamforming database (DB) 420, an antenna array controller 430, a beam DB 440, a FWA device interface 450, a KPI monitor 460, and a beam selector 470.

Beam scanning module 410 may scan for available antenna beams generated by 5G base station 160 using information stored in beamforming DB 420. Beamforming DB 420 may store a set of settings for antenna array 230 that enables beam scanning module 410 to tune antenna array 230 through a range of available tunings. For example, beam scanning module 410 may instruct antenna array controller 430 to select a particular antenna setting for antenna array 230.

Antenna array controller 430 may adjust the phase and/or amplitude of particular antenna elements in a particular sequence to generate the particular antenna beam pattern or to tune into a particular antenna beam pattern based on the antenna setting. Beam scanning module 410 may store information relating to identified antenna beams in beam DB 440. Exemplary information that may be stored in beam DB 440 is described below with reference to FIG. 5.

FWA device interface 450 may be configured to communicate with FWA device 120. For example, FWA device interface 450 may receive, from FWA device 120, information indicating whether FWA device 120 has been able to lock onto a particular antenna beam to which antenna array 230 has been tuned and/or information identifying one or more KPI values measured by FWA device 120 for a particular antenna beam onto which FWA device 120 has been able to lock. FWA device interface 450 may provide the received KPI values to KPI monitor 460. Furthermore, FWA device interface 450 may receive information identifying one or more KPI threshold requirements associated with FWA device 120 and provide the KPI threshold requirements to KPI monitor 460.

KPI monitor 460 may monitor KPI values associated with a selected antenna beam to determine whether a threshold requirement associated with FWA device 120 is satisfied. If a KPI threshold requirement is not satisfied, KPI monitor 460 may alert beam selector 470. Beam selector 470 may select antenna beams to which to tune antenna array 230 based on information stored in beam DB 440. For example, beam selector 470 may implement a finite state machine as described below with reference to FIG. 6.

Although FIG. 4 shows exemplary components of repeater device 210, in other implementations, repeater device 210 may include fewer components, different components, differently arranged components, or additional components than depicted in FIG. 4. Additionally, or alternatively, one or more components of repeater device 210 may perform functions described as being performed by one or more other components of repeater device 210.

FIG. 5 is a diagram illustrating exemplary information stored in beam DB 440 according to an implementation described herein. As shown in FIG. 5, beam DB 440 may include one or more beam records 500. Each beam record 500 may store information relating to a particular beam identified by beam scanning module 410. Beam record 500 may include a beam identifier (ID) field 510, an antenna settings field 520, a connection field 530, and one or more time period records 540.

Beam ID field 510 may store an ID assigned by beam scanning module 410 to a particular antenna beam generated by 5G base station 160 and identified by beam scanning module 410. Antenna settings field 520 may store information identifying antenna settings for antenna array 230 associated with the particular antenna beam. Connection field 530 may store information identifying whether FWA device 120 was able to connect to 5G base station 160 via the particular antenna beam. Thus, connection field 530 may include information identifying whether the particular antenna beam is associated with the provider that manages FWA device 120.

Each time period record 540 may store information associated with the particular beam during a particular time period. Each time period record 540 may include a time period field 542, a repeater KPI field 544, a rank field 546, and a FWA device field 548. Time period field 542 may identify a particular time period, such as, for example, a most recent time period, a time of day, a day of week, a time of year, and/or another type of time period.

Repeater KPI field 544 may store one or more KPI values associated with the particular antenna beam during the particular time period as determined by repeater device 125. The KPI values determined by repeater device 125 and stored in repeater KPI field 544 may be used to rank the identified antenna beams and the rank may be stored in rank field 546. The rank stored in rank field 546 may be used to determine the sequence in which the identified antenna beams are tried for establishing a connection between 5G base station 160 and FWA device 120.

FWA device KPI field 548 may store one or more KPI values associated with the particular antenna beam during the particular time period as determined by FWA device 120. The one or more KPI values determined by FWA device 120 may be provided to repeater device 125 by FWA device 120 after FWA device 120 connects to 5G base station 160 via the particular antenna beam. The one or more KPI values stored in FWA device KPI field 548 may be used to determine whether the particular antenna beam satisfies a KPI threshold requirement. The KPI values stored in repeater KPI field 544 and/or FWA device KPI field 548 may include an RSRP value, an RSRQ value, an RSSI value, a SINR value, a SNR value, a BLER value, a channel state information (CSI) value, and/or another type of KPI value. Additionally, repeater KPI field 544 may store an amplifier gain setting for repeater device 125.

Although FIG. 5 shows exemplary components of beam DB 440, in other implementations, beam DB 440 may include fewer components, different components, additional components, or differently arranged components than depicted in FIG. 5.

Figure 6:
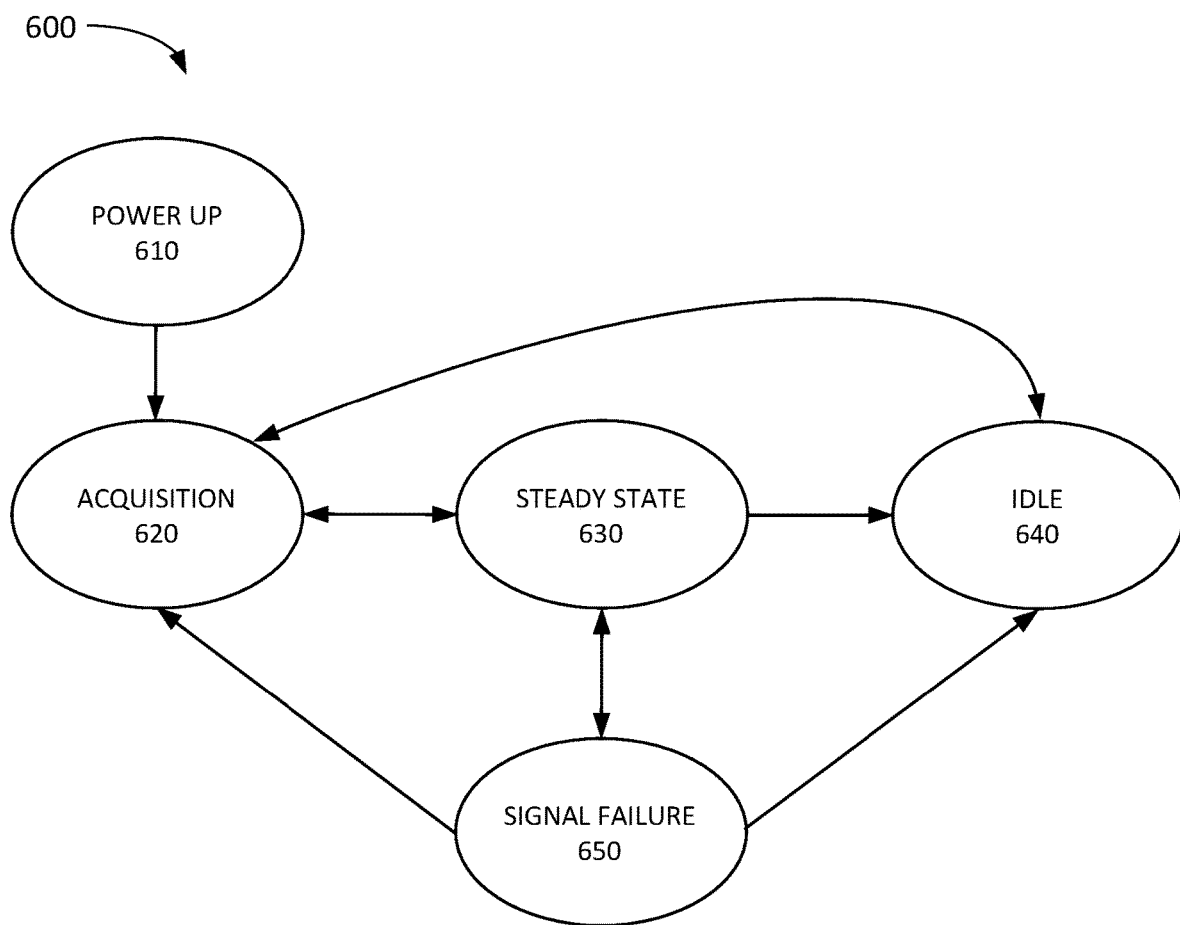
FIG. 6 is a diagram illustrating an exemplary finite state machine that may be implemented by the controller of FIG. 2.

FIG. 6 is a diagram illustrating an exemplary finite state machine (FSM) 600 that may be implemented by controller 210. FSM 600 may be implemented by beam selector 470 of controller 210. As shown in FIG. 6, finite state machine 600 may include a power up state 610, an acquisition state 620, a steady-state state 630, an idle state 640, and a signal failure state 650.

FSM 600 may enter power up state 610 when repeater device 125 is powered up and FWA device 120 is also powered up. If FWA device 120 is not powered up, repeater device 125 may wait in standby mode for FWA device 120 to power up. Additionally, FSM 600 may enter power up state 610 when repeater device 125 is reset or when FWA device 120 is reset. During power up state 610, repeater device 125 may pair with FWA device 120 using short-range antenna 250. Additionally, repeater device 125 may establish a communication channel with FWA device 120 via 5G antenna 240. FSM 600 may exit power up state 610 to acquisition state 620 when FWA device 120 transitions from an RRC idle mode to an RRC connected mode, or if FWA device 120 is already in RRC connected mode when repeater device 125 powers up.

FSM 600 may enter acquisition state 620 from power up state 610 when FWA device 120 enters an RRC connected mode, from steady-state state 630 when wireless access network 140 de-configures a current 5G base station 160 without configuring a new 5G base station 160, and from signal failure state 650 when FWA device 120 is in RRC connected mode and declares a radio link failure or when a KPI threshold requirement is no longer satisfied.

In acquisition state 620, repeater device 125 may scan through a set of antenna array settings to identify available antenna beams, determine the signal strength/quality of the identified antenna beams based on one or more KPI values, and rank the identified antenna beams based on the one or more KPI values. Repeater device 125 may then cycle through the ranked antenna beams in descending rank order until repeater device 125 selects an antenna beam to which FWA device 120 is able to connect and communicate with 5G base station 160 while satisfying a KPI threshold requirement associated with FWA device 120.

FSM 600 may exit acquisition state 620 into steady-state state 630 when FWA device 120 locks onto a selected antenna beam and is able communicate with 5G base station 160 via the selected antenna beam while satisfying the KPI threshold requirement. Furthermore, FSM 600 may exit acquisition state 620 into idle state 640 when FWA device 120 enters an RRC idle mode.

FSM 600 may enter steady-state state 630 from acquisition state 620 as described above, or from signal failure state 650 if FWA device 120 is able to re-acquire a selected beam after a radio link failure within a particular time period, or if FWA device 120 is able to re-establish a KPI value that satisfies a KPI threshold requirement within the particular time period. FSM 600 may exit steady-state state 630 to signal failure state 650 when FWA device 120 reports a radio link failure or a KPI value below the KPI threshold requirement, may exit stead-state state 630 to idle state 640 when FWA device 120 transitions from an RRC connected state to an RRC idle state, and may exit steady-state state 630 to acquisition state 620 when wireless access network 140 de-configures the 5G SCG base station 160 without configuring a new 5G SCG base station 160, if 5G base station 160 de-configures the selected antenna beam, or if wireless access network 140 configures a new 5G SCG base station 160.

FSM 600 may enter idle state 640 from steady-state state 630 when FWA device 120 transitions from an RRC connected state to an RRC idle state and may enter a power saving mode while in idle state 640. Repeater device 125 may maintain antenna array 230 tuned to the selected antenna beam while in idle state 640. FSM 600 may also enter idle state 640 from signal failure state 650 or acquisition state 620 if FWA device 120 transitions from an RRC connected state to an RRC idle state while in signal failure state 650.

FSM 600 may enter signal failure state 650 from steady-state state 630 when FWA device 120 reports a radio link failure or a KPI value below the KPI threshold requirement, as described above. In signal failure state 650, FSM 600 may wait a particular time period (e.g., a particular number of seconds) to determine whether FWA device 120 may re-acquire a connection to 5G base station 160 via the selected antenna beam while satisfying the KPI threshold requirement. For example, a temporary obstruction, such as a large vehicle, may cause a disruption of the selected antenna beam. If FWA device 120 is unable to re-acquire the connection within the particular time period, FSM 600 may transition to acquisition state 620 to select the best available antenna beam.

Although FIG. 6 shows exemplary components of finite state machine 600, in other implementations, finite state machine 600 may include fewer states, different states, additional states, or differently arranged states than depicted in FIG. 6.

Figure 7:
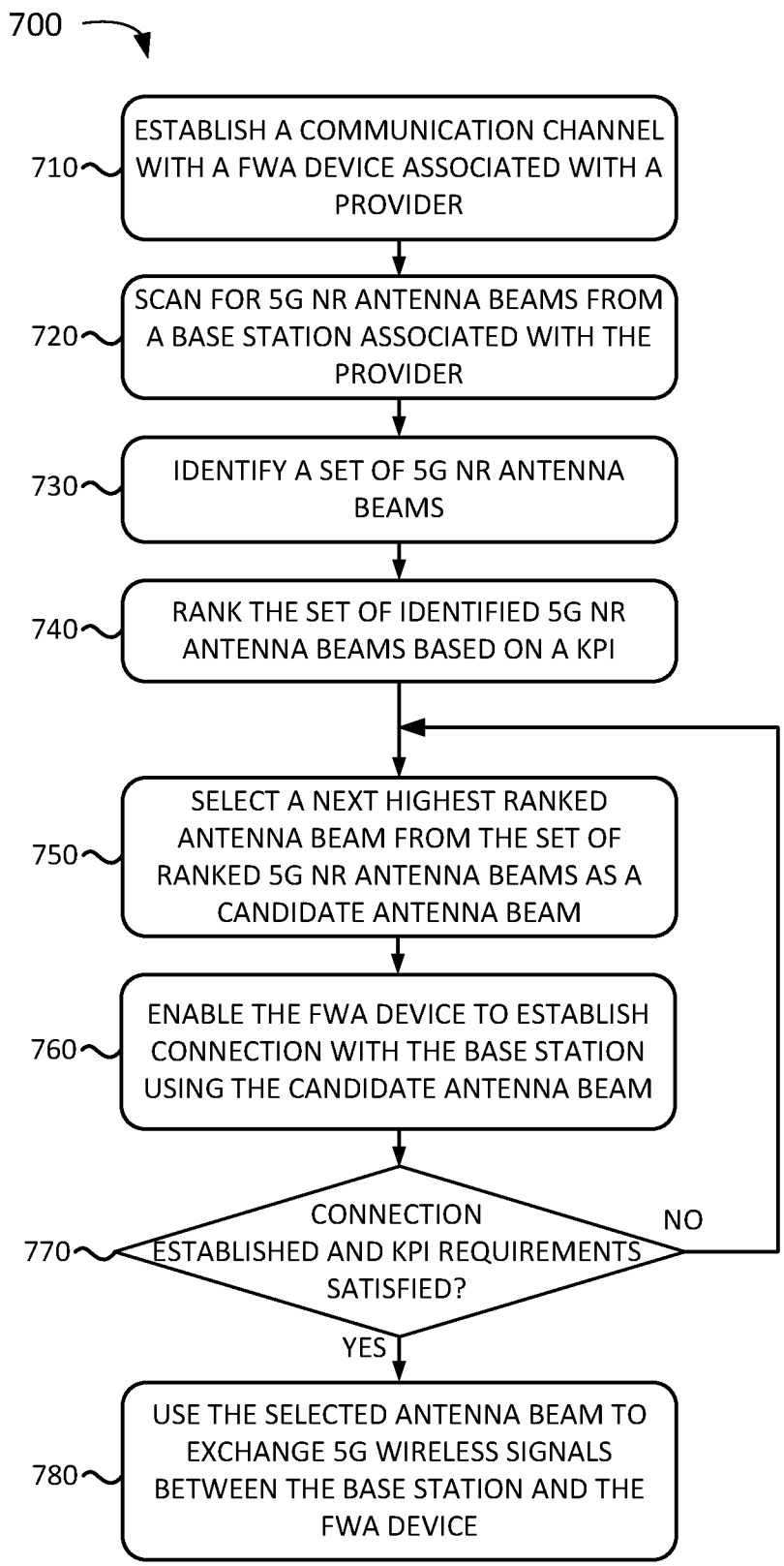
FIG. 7 is a flowchart of a process for selecting a beam according to an implementation described herein.

FIG. 7 is a flowchart of a process 700 for selecting a beam according to an implementation described herein. In some implementations, the process of FIG. 7 may be performed by repeater device 125. In other implementations, some or all of the process of FIG. 7 may be performed by another device or a group of devices separate from repeater device 125.

The process of flowchart 700 may include establishing a communication channel with a FWA device associated with a provider (block 710). For example, FWA device 120 and repeater device 125 may be paired via a WiFi or Bluetooth connection and repeater device 125 may receive an identifier associated with FWA device 120 via the connection. The identifier may include an International Mobile Equipment Identity (IMEI), an International Mobile Subscriber Identity (IMSI), a Mobile Directory Number (MDN), a Mobile Station International Subscriber Directory Number (MSISDN), a Globally Unique Temporary Identity (GUTI), a Cell Radio Network Temporary Identity (CRTNI), an IP address, a Media Access Control (MAC) address, and/or another type of identifier that may be used by repeater device 125 to identify and establish communication with FWA device 120. Once FWA device 120 and repeater device 125 are paired, repeater device 125 may communicate with FWA device 120 via short-range antenna 250.

A scan may be performed for 5G NR antenna beams from a base station associated with the provider (block 720) and a set of 5G NR antenna beams may be identified (block 730) and ranked (block 740). For example, repeater device 125 may take antenna array 230 through a series of antenna settings to identify available 5G NR antenna beams. A 5G NR antenna beam may be identified if repeater device 125 detects signals at a particular antenna setting that are higher than a signal strength threshold. Repeater device 125 may rank the detected antenna beams based on KPI values, such as, for example, RSRP, SINR, and/or another type of KPI.

A next highest ranked antenna beam may be selected from the set of ranked 5G NR antenna beams as a candidate antenna beam (block 750) and the FWA device may be enabled to establish a connection with 5G base station 160 using the selected candidate antenna beam (block 760). For example, repeater device 125 may select the highest ranked identified antenna beam as a candidate antenna beam, tune antenna array 230 to the candidate antenna beam, receive signals via the candidate antenna beam, amplify the signals, and transmit the signals toward FWA device 120 via 5G antenna 240. The signals may include, for example, a 5G synchronization signal block (SSB) transmitted at a particular carrier frequency, subcarrier spacing, and timing configuration associated with the provider. Furthermore, the signals may include a master information block (MIB) and/or one or more different system information blocks (SIBs).

In some implementations, repeater device 125 may be configured to access the physical layer information included in a 5G NR antenna beam transmitted by the 5G base station 160 and may be configured to select a 5G NR antenna beam based on the physical layer information. For example, repeater device 125 may be configured to identify 5G NR antenna beams associated with a provider that manages FWA device 120 by accessing SSB, MIB, SIB, and/or other type of information included in the signals transmitted via a particular 5G NR antenna beam. Thus, repeater device 125 may only select 5G antenna beams associated with the provider.

A determination may be made as to whether the connection was established and KPI requirements were satisfied (block 770). For example, repeater device 125 may wait for a particular time period to determine whether FWA device 120 is able to decode the transmitted 5G SSB and establish communication with 5G base station 160. FWA device 120 may have obtained the configuration information for the 5G SSB from wireless access network 140 via, for example, an existing 4G LTE connection with 4G base station 150 in a B1 event measurement object. The measurement object may provide to FWA device 120 the SSB configuration, such as the carrier frequency, subcarrier spacing, and/or timing configuration for the 5G SSB signal. If the selected candidate antenna beam is not associated with the provider, FWA device 120 may not be able to decode the 5G SSB signal and/or may not be able to establish a connection with 5G base station 160 for other reasons. Thus, repeater device 125 may need to select another candidate beam.

If FWA device 120 is able to establish a connection with 5G base station 160, repeater device 125 may obtain one or more KPI values from FWA device 120 for KPI values measured by FWA device 120 for the selected candidate antenna beam. Repeater device 125 may determine whether the KPI values obtained from FWA device 120 satisfy KPI threshold requirements for FWA device 120. In some implementations, the KPI values may be obtained by repeater device 125 from FWA device 120 via a short-range wireless connection using short-range antenna 250.

If it is determined that the connection was not established or KPI requirements were not satisfied (block 770—NO), processing may return to block 750 to select the next highest ranked antenna beam as the next candidate beam. If it is determined that the connection was established and that the KPI requirements are satisfied (block 770—YES), the selected candidate antenna beam may be selected as the antenna beam for FWA device 120 and the selected antenna beam may be used to exchange 5G wireless signals between 5G base station 160 and FWA device 120 (block 780). For example, repeater device 125 may enter steady-state state 630 and may function as a repeater for signals exchanged between 5G base station 160 and FWA device 120 using the selected antenna beam.

Figure 8:
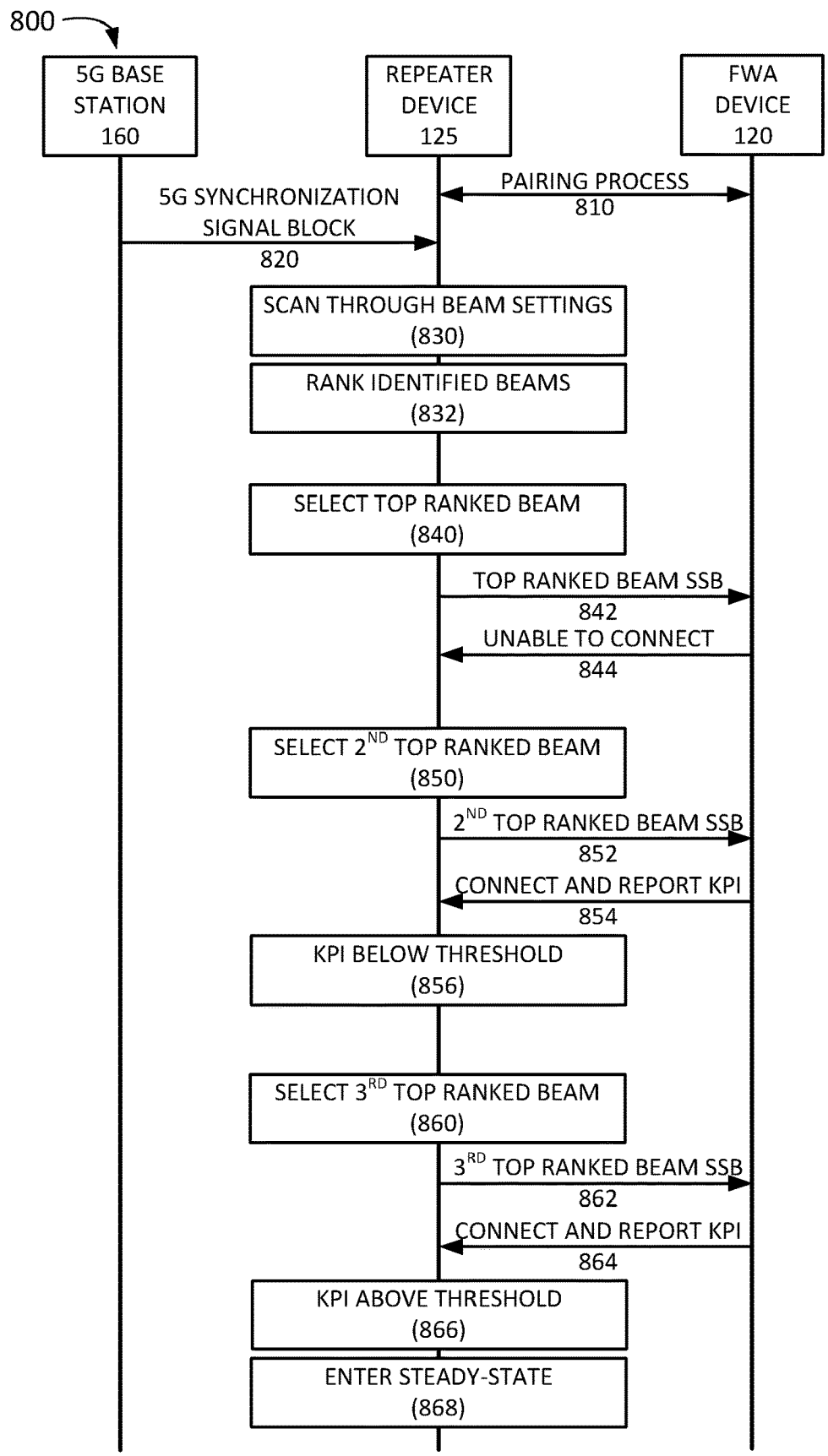
FIG. 8 is a diagram of an exemplary signal flow according to an implementation described herein.

FIG. 8 is a diagram of an exemplary signal flow 800 according to an implementation described herein. As shown in FIG. 8, signal flow 800 may include a pairing process between repeater device 125 and FWA device 120 (signal 810). For example, FWA device 120 and repeater device 125 may be paired via a WiFi or Bluetooth connection and repeater device 125 may receive an identifier associated with FWA device 120 via the connection. 5G base station 160 may generate a set of antenna beams and may transmit 5G SSB signals (signal 820) on one or more 5G antenna beams.

Repeater device 125 may scan through the beam settings (block 830) and rank the identified antenna beams (block 832) based on the signal strength measured by repeater device 125 (e.g., based on an RSRP value, SINR value, etc.). Repeater device 125 may then select the top ranked beam (block 840) and transmit signals from the selected beam to FWA device 120 via 5G antenna 240 (signal 842). Assume the top ranked beam is from another base station that is not associated with the provider and includes a different SSB configuration. Thus, FWA device 120 may be unable to connect to 5G base station 160 because FWA device 120 may not be able to decode the SSB information. In response, FWA device 120 may provide information to repeater device 125 that FWA device 120 is unable to connect to 5G base station 160 (signal 844). In other words, repeater device 125 may detect that FWA device 120 is unable to decode the SSB information and/or unable to send information to 5G base station 160 for other reasons.

In response, repeater device 125 may select the second top ranked antenna beam (block 850) and transmit signals from the selected beam to FWA device 120 via 5G antenna 240 (signal 852). Thus, FWA device 120 may be able to decode the SSB information based on previously obtained configuration information and FWA device 120 may be able to connect to 5G base station 160. Furthermore, FWA device 120 may report one or more KPI values to repeater device 125 (signal 854). Assume the second top ranked beam is associated with the provider but is subject to interference from another beam generated by the other base station in the area that is associated with another provider. Thus, repeater device 125 may determine that the reported KPI values may be below a KPI threshold requirement associated with FWA device 120 (block 856).

In response, repeater device 125 may select the third top ranked antenna beam (block 860) and transmit signals from the selected beam to FWA device 120 via 5G antenna 240 (signal 862). Thus, FWA device 120 may be able to decode the SSB information based on previously obtained configuration information and FWA device 120 may be able to connect to 5G base station 160. Furthermore, FWA device 120 may report one or more KPI values to repeater device 125 (signal 864). Repeater device 125 may determine that the reported KPI values satisfy a KPI threshold requirement associated with FWA device 120 (block 866). In response, repeater device 125 may select the third ranked antenna beam as the antenna beam to use for communication between 5G base station 160 and FWA device 120 and may enter steady-state state 630 of FSM 600 (block 868).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIG. 7, and a series of signal flows has been described with respect to FIG. 8, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method performed by a computer device, the method comprising:
   establishing, by the computer device, a communication channel with a fixed wireless access (FWA) user equipment (UE) device associated with a provider;
   scanning, by the computer device, for Fifth Generation (5G) New Radio (NR) antenna beams from a base station associated with the provider;
   identifying, by the computer device, a plurality of 5G NR antenna beams;

ranking, by the computer device, the plurality of 5G NR antenna beams based on a key performance indicator (KPI);

selecting, by the computer device, a highest ranked antenna beam, from the plurality of 5G NR antenna beams, via which the FWA UE device is able to connect to the base station associated with the provider while satisfying a threshold requirement associated with the KPI; and using, by the computer device, the selected antenna beam to exchange wireless signals between the base station and the FWA UE device.

2. The method of claim 1, wherein selecting the highest ranked antenna beam, from the plurality of 5G NR antenna beams, via which the FWA UE device is able to connect to the base station associated with the provider while satisfying the threshold requirement associated with the KPI includes:

selecting a candidate antenna beam, from the plurality of 5G NR beams;

enabling the FWA UE device to establish a connection with the base station using the selected candidate antenna beam;

determining whether the FWA UE device is able to communicate with the base station via the selected candidate antenna beam while satisfying the threshold requirement associated with the KPI; and selecting a next highest ranked antenna beam as a next candidate antenna beam, in response to determining that the FWA UE device is not able to communicate with the base station via the selected candidate antenna beam while satisfying the threshold requirement associated with the KPI.

3. The method of claim 2, further comprising:

cycling through the ranked plurality of 5G NR beams in descending rank until the FWA UE device is able to connect to the base station via one of the ranked plurality of 5G NR beam while satisfying the threshold requirement associated with the KPI.

4. The method of claim 1, further comprising:

detecting a power up state;

detecting that the FWA UE device entered a powered-on state; and entering an acquisition state, in response to detecting that the FWA UE device entered the powered-on state, wherein entering the acquisition state initiates the method of claim 1.

5. The method of claim 1, further comprising:

entering a steady-state state, in response to selecting the highest ranked antenna beam, from the plurality of 5G NR antenna beams, via which the FWA UE device is able to connect to the base station associated with the provider while satisfying the threshold requirement associated with the KPI; and maintaining the steady-state state while the threshold requirement associated with the KPI is satisfied.

6. The method of claim 5, further comprising:

detecting at least one of the threshold requirement associated with the KPI not being satisfied for the selected beam or a radio link failure report from the FWA UE device for the selected beam;

entering a signal failure state, in response to detecting at least one of the threshold requirement associated with the KPI not being satisfied for the selected beam or the radio link failure report from the FWA UE device for the selected antenna beam;

waiting a particular time period to determine whether the threshold requirement associated with the KPI becomes satisfied for the selected antenna beam;

re-entering the steady-state state, if the threshold requirement associated with the KPI becomes satisfied for the selected antenna beam within the particular time period; and entering an acquisition state, if the threshold requirement associated with the KPI does not become satisfied for the selected antenna beam within the particular time period, wherein entering the acquisition state initiates the method of claim 1.

7. The method of claim 1, further comprising:

detecting that the FWA UE device has entered a Radio Resource Control (RRC) idle mode; and entering an idle state, in response to detecting that the FWA UE device has entered the RRC idle mode, wherein entering the idle state includes the computer device entering a power saving mode.

8. The method of claim 1, wherein establishing the communication channel with the FWA UE device associated with the provider includes:

obtaining an identifier associated with the FWA UE device via a WiFi or Bluetooth connection; and obtaining one or more KPI values from the FWA UE device via the WiFi or Bluetooth connection.

9. The method of claim 1, wherein the KPI includes at least one of:

a Reference Signal Received Power (RSRP) value a Reference Signal Received Quality (RSRQ) value, a Received Signal Strength Indication (RSSI) value, a signal-to-interference-plus-noise ratio (SINR) value, a signal to noise ratio (SNR) value, a block error rate (BLER) value, an amplifier gain setting value, or a channel state information (CSI) value.

10. The method of claim 1, wherein scanning for 5G NR antenna beams from a base station associated with the provider includes:

tuning a beamforming antenna through a plurality of beamforming settings.

11. A computer device comprising:

a memory storing instructions; and a processor configured to execute the instructions to:

establish a communication channel with a fixed wireless access (FWA) user equipment (UE) device associated with a provider;

scan for Fifth Generation (5G) New Radio (NR) antenna beams from a base station associated with the provider;

identify a plurality of 5G NR antenna beams;

rank the plurality of 5G NR antenna beams based on a key performance indicator (KPI);

select a highest ranked antenna beam, from the plurality of 5G NR antenna beams, via which the FWA UE device is able to connect to the base station associated with the provider while satisfying a threshold requirement associated with the KPI; and use the selected antenna beam to exchange wireless signals between the base station and the FWA UE device.

12. The computer device of claim 11, wherein, when selecting the highest ranked antenna beam, from the plurality of 5G NR antenna beams, via which the FWA UE device is able to connect to the base station associated with the provider while satisfying the threshold requirement associated with the KPI, the processor is further configured to:

select a candidate antenna beam, from the plurality of 5G NR beams;

enable the FWA UE device to establish a connection with the base station using the selected candidate antenna beam;

determine whether the FWA UE device is able to communicate with the base station via the selected candidate antenna beam while satisfying the threshold requirement associated with the KPI; and select a next highest ranked antenna beam as a next candidate antenna beam, in response to determining that the FWA UE device is not able to communicate with the base station via the selected candidate antenna beam while satisfying the threshold requirement associated with the KPI.

13. The computer device of claim 12, wherein the processor is further configured to:

cycle through the ranked plurality of 5G NR beams in descending rank until the FWA UE device is able to connect to the base station via one of the ranked plurality of 5G NR beam while satisfying the threshold requirement associated with the KPI.

14. The computer device of claim 11, wherein the processor is further configured to:

enter a steady-state state, in response to selecting the highest ranked antenna beam, from the plurality of 5G NR antenna beams, via which the FWA UE device is able to connect to the base station associated with the provider while satisfying the threshold requirement associated with the KPI; and maintain the steady-state state while the threshold requirement associated with the KPI is satisfied.

15. The computer device of claim 14, wherein the processor is further configured to:

detect at least one of the threshold requirement associated with the KPI not being satisfied for the selected beam or a radio link failure report from the FWA UE device for the selected beam;

enter a signal failure state, in response to detecting at least one of the threshold requirement associated with the KPI not being satisfied for the selected beam or the radio link failure report from the FWA UE device for the selected antenna beam;

wait a particular time period to determine whether the threshold requirement associated with the KPI becomes satisfied for the selected antenna beam;

re-enter the steady-state state, if the threshold requirement associated with the KPI becomes satisfied for the selected antenna beam within the particular time period; and enter an acquisition state, if the threshold requirement associated with the KPI does not become satisfied for the selected antenna beam within the particular time period.

16. The computer device of claim 11, wherein the processor is further configured to:

detect that the FWA UE device has entered a Radio Resource Control (RRC) idle mode; and enter an idle state, in response to detecting that the FWA UE device has entered the RRC idle mode, wherein entering the idle state includes the computer device entering a power saving mode.

17. The computer device of claim 11, wherein, when establishing the communication channel with the FWA UE device associated with the provider, the processor is further configured to:

obtain an identifier associated with the FWA UE device via a WiFi or Bluetooth connection; and obtain one or more KPI values from the FWA UE device via the WiFi or Bluetooth connection.

18. The computer device of claim 11, wherein the KPI includes at least one of:

a Reference Signal Received Power (RSRP) value a Reference Signal Received Quality (RSRQ) value, a Received Signal Strength Indication (RSSI) value, a signal-to-interference-plus-noise ratio (SINR) value, a signal to noise ratio (SNR) value, a block error rate (BLER) value, an amplifier gain setting value, or a channel state information (CSI) value.

19. The computer device of claim 11, wherein, when scanning for 5G NR antenna beams from a base station associated with the provider, the processor is further configured to:

tune a beamforming antenna through a plurality of beamforming settings.

20. A repeater device comprising:

an antenna array configured to generate a plurality of antenna beams; and a controller configured to:

establish a communication channel with a fixed wireless access (FWA) user equipment (UE) device associated with a provider;

scan for Fifth Generation (5G) New Radio (NR) antenna beams from a base station associated with the provider using the antenna array;

identify a plurality of 5G NR antenna beams;

rank the plurality of 5G NR antenna beams based on a key performance indicator (KPI);

select a highest ranked antenna beam, from the plurality of 5G NR antenna beams, via which the FWA UE device is able to connect to the base station associated with the provider while satisfying a threshold requirement associated with the KPI; and configure the antenna array to use the selected antenna beam to exchange wireless signals between the base station and the FWA UE device.

* * * * *